Figure 4:
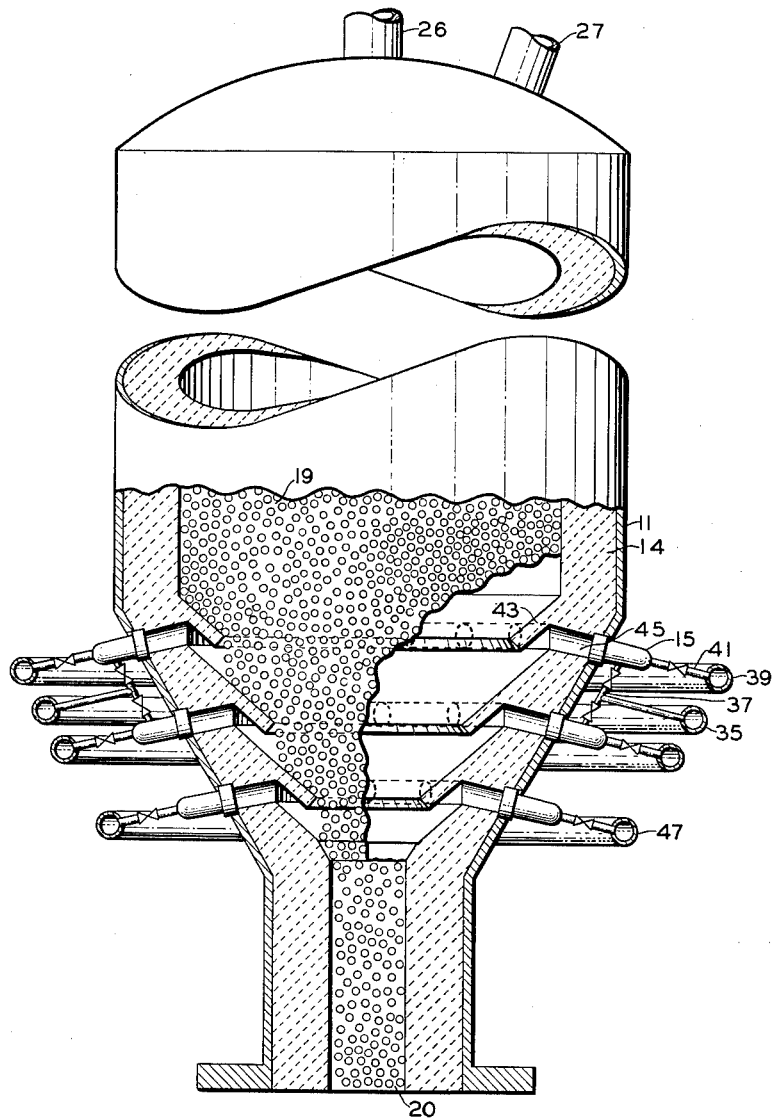

Dec. 2, 1952  L. J. WEBER  2,620,175
PEBBLE HEATER APPARATUS
Filed Dec. 20, 1948  3 Sheets-Sheet 1
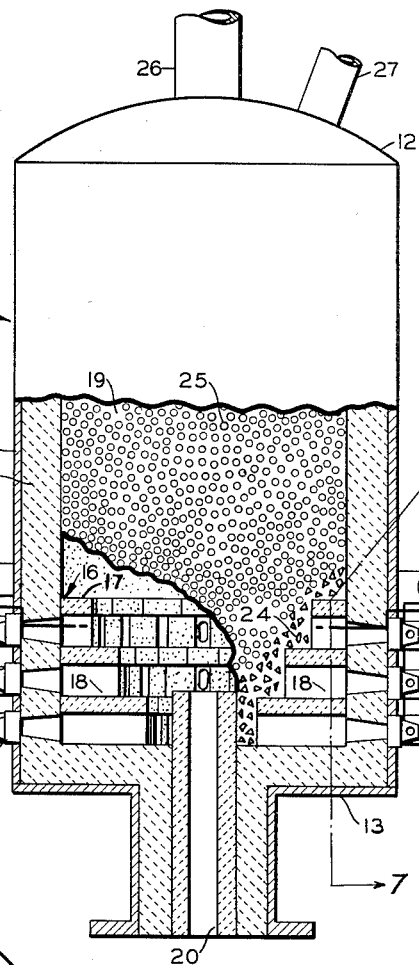
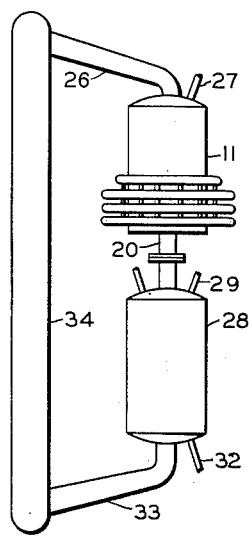
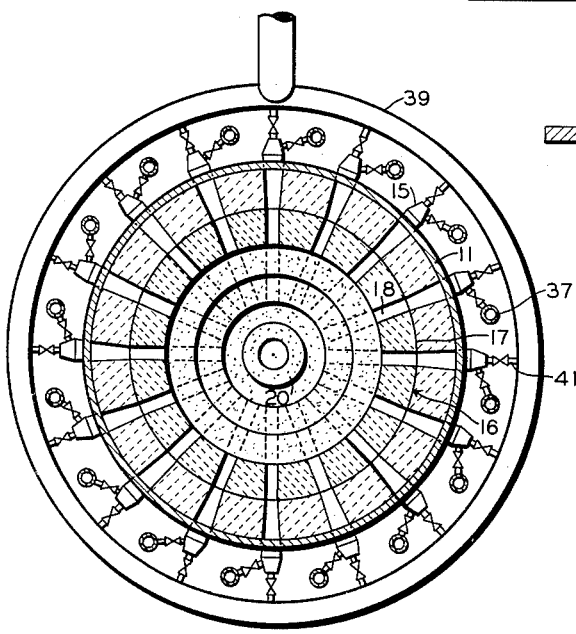
INVENTOR.
L. J. WEBER
BY Hudson and Young
ATTORNEYS Dec. 2, 1952

L. J. WEBER 2,620,175

PEBBLE HEATER APPARATUS

Filed Dec. 20, 1948

3 Sheets-Sheet 2

INVENTOR.
L. J. WEBER
BY
*Hudson and Young*
ATTORNEYS

Dec. 2, 1952     L. J. WEBER     2,620,175
PEBBLE HEATER APPARATUS
Filed Dec. 20, 1948     3 Sheets-Sheet 3
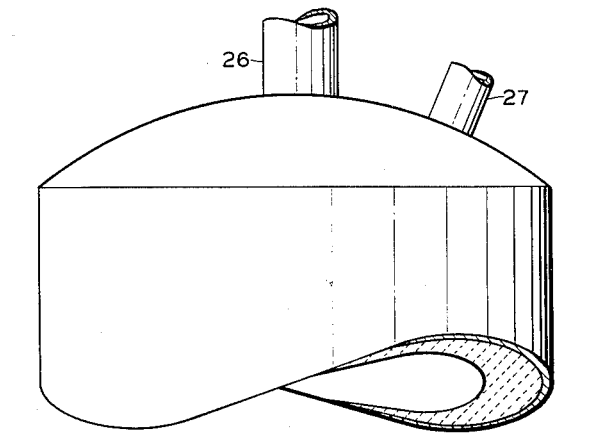
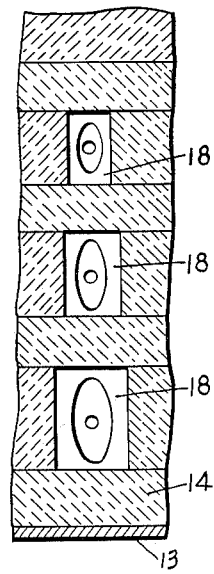
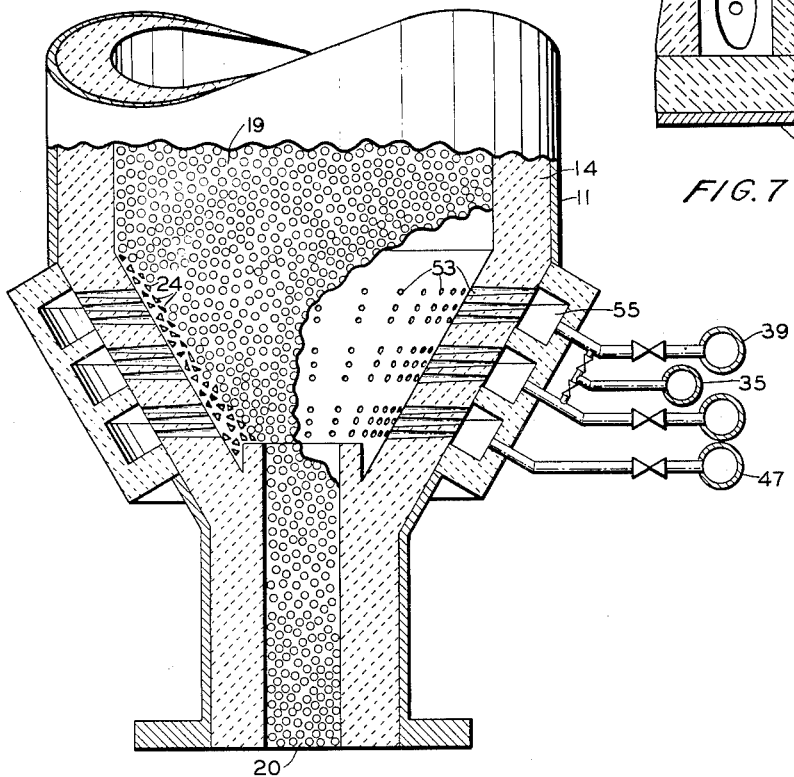
INVENTOR.
L. J. WEBER
BY
Hudson and Young
ATTORNEYS Patented Dec. 2, 1952

2,620,175

UNITED STATES PATENT OFFICE 2,620,175

PEBBLE HEATER APPARATUS

Louis J. Weber, Bartlesville, Okla., assignor to Phillips Petroleum Company, a corporation of Delaware Application December 20, 1948, Serial No. 66,325

2 Claims. (Cl. 263—19)

This invention relates to pebble heater apparatus. In one of its more specific aspects it relates to thermal conversion apparatus. In another of its more specific aspects it relates to pebble heating chambers of pebble heater apparatus. In still another of its more specific aspects it relates to pebble regeneration chambers of pebble heater apparatus.

Thermal conversion or treating processes carried on in so called pebble heater apparatus utilize a flowing mass of pebbles which is heated to a high temperature by passing hot gases therethrough, in a first direct heat exchange step, and is then caused to contact a reactant fluid, furnishing heat thereto, in a second direct heat exchange. The conventional pebble heater apparatus comprises two chambers which may be disposed in substantially vertical alignment. A solid heat exchange material, such as refractory pebbles, is introduced into the upper portion of the first chamber. The solid heat exchange material flows downwardly through the chamber in direct heat exchange with a hot gaseous heat exchange material. The solid heat exchange material is heated to a high temperature in the heat exchange and is then passed to a second chamber in which the hot solid heat exchange material is caused to contact a fluid in a second direct heat exchange relation, furnishing heat for the treatment or conversion of the fluid.

Many conventional pebble heaters are provided with a combustion chamber adjacent or in close proximity to the lower portion of the first chamber. A hot combustion gas from the combustion chamber is injected through the sides of the first chamber, better known as the pebble heating chamber. Pebbles which pass downwardly through the heating chamber contact the rising combustion gas and are heated as above described. One disadvantage of such conventional pebble heater apparatus is that pebbles near the periphery of the pebble bed in the heating chamber are heated to a higher temperature than those in the center of the downwardly flowing bed. This is due to the fact that a greater portion of the combustion gas tends to take the path of least resistance through the pebble bed. In most pebble apparatus, pebbles are introduced into the pebble heater chamber through a single opening in its top. Pebbles are withdrawn from a point substantially centrally located in the area of the heating chamber. As pebbles flow through the chamber, they tend to form a cone downwardly and outwardly from the pebble inlet, and the pebbles flowing out of the chamber tend to form an inverted cone downwardly and inwardly toward the pebble outlet. It will be seen that due to the cone shaped top and bottom of the bed, the area near the periphery of the bed is usually the thinnest and the point of least resistance for upwardly flowing gas. Gas tends to pass directly upwardly from the gas inlet, through the periphery of the bed and out of the effluent (flue-gas) outlet in the top of the chamber. A portion of the pebble bed below the moving cone of pebbles is relatively stagnant. Once these pebbles in the stagnant area are heated they lose very little of their heat and thus receive very little heat from the gas passing upwardly therethrough. For that reason, gas leaving the heating chamber through the effluent outlet carries with it a considerable amount of heat which could have been imparted to cooler pebbles flowing downwardly in the central portion of the chamber.

In conventional pebble heating chambers the pebbles are heated by means of a hot flue-gas generated in a chamber separate and external to the chamber containing the pebbles. Construction for such an arrangement is expensive and difficult. Since the usual pebble bed contains approximately 50 per cent void space, heretofore, the smallest flue-gas passage was through a ceramic dome or other screen between the flue-gas chamber and the pebble heating chamber containing the pebbles. In the novel pebble heating chamber and method of my invention this restriction has been removed and flue-gas pressure drop has been reduced. In addition, construction and maintenance is simplified. In the novel apparatus and method of my invention combustion is carried on within the pebble bed. A mixture of combustible gases is directed into the pebbles in the lower portion of the pebble heating chamber. This combustion mixture burns on the surface of the pebbles. Heat may be regulated to any zone within the pebble heating chamber by proper regulation of fuel-gas and oxygen-containing gas to mixers or by regulating the amount of a pre-mixed combustible mixture injected into the pebble bed. Various types of mixers can be satisfactorily used, and their arrangement varied, to accomplish the desired heating job or the inlets for a pre-mixed combustible mixture may be varied so as to accomplish a desired heating job. Furthermore, with a typical pebble heating chamber with a separate combustion zone, it is necessary to compress a considerable amount of air or oxygen-containing gas in excess of that required for combustion in order to have a sufficient volume of flue-gas to carry the heat released in the combustion zone to the pebble bed. This procedure is necessary to avoid burning up the combustion zone which has no heat absorbing surfaces. This means that the quantity of flue-gases passing from the bed and out of the chamber is greater than desired; and since these gases are at a relatively high temperature, the thermal efficiency of the unit is greatly reduced. In the novel apparatus of my invention this difficulty is overcome, because a combustible mixture of fuel-gas and an oxygen-containing gas at approximately stoichiometric concentrations is passed into the pebble bed and combustion is carried out on a heat absorbing surface, namely the pebbles. Thus the quantity of air or other oxygen-containing gas which must be compressed is substantially reduced and the amount of heat lost from the unit in effluent flue-gas is likewise reduced. Also, one of the valuable advantages of the apparatus of my invention is the provision for the injection of the desired amount of heat at any level in the pebble heating chamber. Since the amount of heat injection into any annular portion of the pebble bed may be controlled, it is possible to raise the pebbles to the final high temperature level desired just before they pass from the pebble heating chamber. This is an advantage since the pebbles are exposed to the desired high temperature for only a very short period of time, and refractory pebbles which have a tendency to sinter or spall may be used much more satisfactorily than with a typical chamber wherein a substantial volume of the pebbles are subjected to a high temperature for extended periods of time. For this reason it is possible to heat pebbles by the apparatus of my invention to a higher temperature than is possible with the usual type of pebble heater apparatus.

An object of my invention is to provide an improved chamber for heating pebbles in pebble heater apparatus.

Another object is to provide an improved means for transporting a pebble bed within heating chambers of pebble heater apparatus.

Still another object of my invention is to provide means for more evenly heating a given cross-section of a flowing pebble bed in such a heating chamber.

Other and further objects will be apparent, to those skilled in the art, on reference to the accompanying discussion, drawings and claims.

The term "pebble" as used herein denotes any solid refractory material of flowable form, size, and strength which is suitable to carry large amounts of heat from the pebble heating chamber to the gas heating chamber. Pebbles conventionally used in pebble heater apparatus are substantially spherical in shape and are from about 1/8 inch to about 1 inch in diameter. In a high temperature process, pebbles having a diameter of between about 1/4 inch to about 3/8 inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as a metal alloy, ceramic, or other satisfactory material, may be utilized to form such pebbles. Satisfactory pebbles may be formed of silicon carbide, alumina, periclase, beryllia, stellite, zirconia and mullite in admixture with each other or with other materials. Pebbles formed of such materials, when properly fired, serve very well at high temperatures, some withstanding temperatures up to about 3500° F. Pebbles which are inert or catalytic may be used in selected processes.

Figure 5:
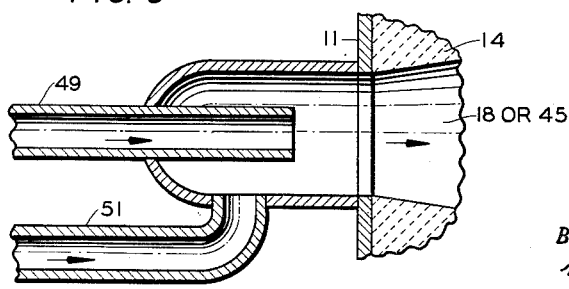

Understanding of my invention will be facilitated upon reference to the attached diagrammatic drawings in which Figure 1 is a vertical section of a preferred pebble heating chamber embodying my invention, particularly well suited to carry out pebble heating by the surface combustion method. Figure 2 is a plan view taken on line 2—2 of Figure 1. Figure 3 is a schematic view of a pebble heater apparatus showing the relation between the pebble heating and reactor chambers and the path of pebble recycle. Figure 4 is a vertical section of a pebble heating chamber of different design than that shown in Figure 1 and so adapted to carry out pebble surface combustion of combustible heating gases. Figure 5 is a cross-sectional view of a mixer suitable to use with the pebble heating chambers shown which may be used to mix fuel-gas and air or other oxygen-containing gas so as to form a combustible mixture which is directed into the pebble bed. Figure 6 is a vertical section of a pebble heating chamber of different design than those shown in Figures 1 and 4 and so adapted to carry out pebble surface combustion of combustible heating gases. Figure 7 is a vertical section taken on line 7—7 of Figure 1. It shows a preferred construction of the combustible gaseous-mixture inlet conduits.

In Figure 1, pebble heating chamber 10 comprises shell 11 which is closed at its ends by members 12 and 13. The walls of shell 11 are lined with insulating means, including super-refractory and common refractory materials 14. Common refractory materials may include block insulation, insulating fire brick, and fire clay fire brick. Super-refractory materials may include silicon carbide, mullite, alumina, or other suitable refractory having physical and chemical properties which give it sufficient strength to withstand a reasonably heavy load and a high temperature without substantial breakage or deterioration. Silicon carbide may be satisfactorily used in operations utilizing temperatures up to about 3000° F. Mullite can also be satisfactorily used at temperatures up to about 3000° F., while alumina may be satisfactorily used at temperatures up to about 3300° F. The above materials may be used at those temperatures, without substantial oxidation or reaction, with most conventionally used pebbles. The bottom as well as the sides of the shell may be lined with layers of common or super-refractory materials or both. When the apparatus is operated at high temperatures the top of the heating chamber may also be insulated. The construction of wall 16 inside lining 14 is such that bricks 17 used in its construction form a grill work, which grill work, in turn, forms a plurality of conduits 18, communicating between combustible gas mixers 15 and the pebble bed in pebble heating chamber 19. If desired, pre-mixed combustible gases may be supplied to conduits 18 or the apparatus may be operated by supplying pre-mixed combustible gases to some of the conduits and mixing the combustible gases in mixers 15 near the inlet of the other conduits. Air is supplied to mixers 15 by ring 35 and lines 37 while gas is supplied to mixers 15 by rings 39 and lines 41. While the supply means shown is preferred, other means of supplying fuel-gas and oxygen-containing gas may be used. In the preferred construction of conduits 18, the conduits in each succeeding layer from the bottom to the top of the grill work have a smaller vertical cross-sectional area than do the conduits in the next preceding lower layer. Figure 7 is a sectional view taken on line 7—7 of Figure 1. It shows this preferred construction of conduits 18 wherein the conduits in each succeeding layer from the bottom to the top of the grill-work have a smaller cross-sectional area than do the conduits in the next preceding lower layer. The lowest layer of conduits extend substantially into the central portion of the pebble heater area and each succeeding layer of conduits is of a shorter length so that gas emerging from the near ends of these conduits will substantially uniformly heat pebbles within the pebble bed. The conduits may be so constructed and arranged that their outlet ends form an inverted cone. The cone surface formed by the conduits may, though not necessarily, be irregular. Extending through closure 13 in the bottom of shell 11 is a refractory pebble outlet 20 which, in one of its preferred constructions, comprises a plurality of refractory rings (not shown) in substantially vertical alignment. The rings may be held in place in any conventional manner, one method being to provide the rings with interlocking tongues and grooves. Covering the outlet ends of conduits 18 and surrounding pebble outlet 20 is separation means, such as aggregate material 24. Aggregate material 24 is provided to prevent refractory pebbles 25 from entering conduits 18. When the separation means comprises aggregate material 24, the layer of aggregate material may be of any desired thickness. The distance which pebble outlet 20 will rise in the pebble heating chamber will generally depend upon the height necessary to retain aggregate material 24 in pebble heating chamber 19. It is preferred to keep the thickness of the layer of aggregate material to a minimum. It is preferred that the apex angle of the cone formed by the aggregate material and conduits 18 be from 100° to about 30°. Pebble inlet means, such as conduit 26, is provided in closure member 12, and effluent (flue-gas) outlet means, such as conduit 27, is also provided in closure member 12.

Conduits 18 may be formed in any conventional manner. A wall of substantially the same thickness as the insulation on the chamber wall may be built with the above described grill work. Refractory extensions may be built within the interior of the wall, which extensions may form conduits which will extend any one of the openings in the wall or form combined opening for two or more such openings. In the preferred construction of such conduits, the wall is so constructed that the wall itself forms the total length of the conduits. That portion of the wall may be formed of tapered bricks, which when fitted together leave a space therebetween which extends from the mixers and/or gaseous combustible mixture feed lines to the interior of the pebble heating chamber. The next layer of bricks is so disposed as to cover the space left between the bricks in the last preceding layer, thereby closing the top of such opening and forming a conduit between the mixers and/or gaseous combustible mixture feed lines and the pebble heating chamber. The tapering bricks may, though not necessarily, be of sufficient length that one brick will extend from the mixers and/or feed lines to the inner end of the conduit. It will be obvious to those skilled in the art that the length of such brick conduits may be formed of a plurality of pieces.

Figure 4 is a diagrammatic vertical section of another design of pebble heating chamber adapted to carry out pebble heating by surface combustion of combustible gases on the pebble surfaces. As is ovious, it is of different construction than the apparatus set out in Figure 1 but is similar to the apparatus set out in Figure 1 in respect that it utilizes surface combustion of the combustible heating gases. Many of the reference characters are the same as those used on Figure 1 since they represent similar equipment etc., performing similar functions. The lower portion of heating chamber 19 is funnel shaped. Refractory baffles 43 around the outer periphery of heating chamber 19 are adapted so as to prevent pebbles from plugging up the combustible gas mixture conduits 45. The downwardly extending baffles 43 also have the beneficial effect of directing the combustible gaseous mixture downwardly into the bed of pebbles where surface combustion takes place. Fuel gas rings 39 and lines 41 supply fuel-gas to mixers 15. Air or oxygen-containing gas is supplied to mixers 15 by ring 35 and lines 37. In Figure 4 ring 47 supplies a pre-mixed combustible gaseous mixture to conduit 45. The apparatus as diagrammatically displayed in Figure 4 functions in the same manner as that apparatus set out in Figure 1. Pebbles enter the heating chamber 19 through conduit 26 and leave through conduit 20. Effluent flue-gas leaves the heating chamber through outlet 27. The chamber is enclosed by an outer metal shell 11 lined with refractory insulation 14. It will be obvious, to those skilled in the art, that various arrangements of combustible gas mixture inlets can be made, however, the apparatus and arrangement shown in Figure 4 is very efficient, easy to construct and is a preferred pebble heating chamber.

Figure 5 is a diagrammatic vertical cross-sectional view of a mixer which may be used as mixers 15. A fuel-gas inlet 49 supplies fuel gas. Line 51 supplies air or other oxygen-containing gas or both. As is apparent, the combustible mixture directly enters conduits 18 or 45. It will be obvious, to those skilled in the art, that other types of mixers can be used in conjunction with the pebble heating apparatus as shown in Figures 1 and 4.

Figure 6 is a diagrammatic vertical section of another type pebble heating apparatus adapted so as to provide for surface combustion of gaseous combustible mixtures on the surface of the pebbles. Many of the reference characters are the same as those used on Figures 1 and 4 since they represent similar equipment performing similar functions. In this apparatus a combustible mixture is supplied to conduits 53 in a different manner than in the apparatus disclosed in Figures 1 and 4. Chambers 55 around the lower outer periphery of the heating chamber receive the combustible gaseous mixture, which mixture is passed to the pebbles within the pebble heating chamber through conduits 53 as in the other methods and apparatus hereinbefore described. The combustible mixture burns on the surface of the pebbles in the lower portion of the pebble heating chamber. As in the apparatus set out in Figure 1 aggregate material 24 acts as a separation means between the inner ends of conduits 53 and the pebbles and also as a gas distributing means. Fuel-gas is supplied to chambers 55 by rings 39 and air is supplied to chambers 55 by ring 35. Ring 47 supplies a pre-mixed combustible gaseous mixture to chambers 55, if desired. A pebble inlet 26 and a pebble outlet 20 and an effluent flue-gas outlet 27 are provided as in the apparatus set out in Figures 1 and 4. The pebble heating chamber is enclosed in an outer metal shell 11 lined with refractory insulation 14. It will be obvious to those skilled in the art that various arrangements of combustible gaseous mixture inlets may be used in the pebble heating apparatus shown in Figure 6 as in that apparatus set out in Figures 1 and 4, however, the apparatus shown in Figure 6 is an efficient and preferred design.

Figure 3 is a schematic diagram showing how the apparatus shown in Figures 1, 2, 4 and 6 is utilized in a complete system. In Figure 3, shell 11 containing pebble heating chamber 19 is provided with effluent outlet 27 in its upper portion and is connected to shell 28, enclosing a fluid heating chamber, by pebble outlet 20. Shell 28 is provided in its upper portion with effluent outlet means, such as conduits 29. Feed inlet means, such as conduit 32, is provided in the lower portion of shell 28. Pebble outlet 33 is also provided in the lower portion of shell 28, and pebble transportation means, such as elevator 34, communicates between pebble outlet 33 in shell 28 and pebble inlet conduit 26 in the top of shell 11.

In the operation of the apparatus shown in Figures 1, 2, 3, 4, 5, 6 and 7 of the drawings, pebbles made from any selected refractory material, suitable for the process to be carried on within the apparatus, are inserted into the upper portion of the heating chamber, through pebble inlet 26. The pebbles pass downwardly and cover the layer of aggregate material 24 and build up a contiguous bed of pebbles through the gas and pebble heating chambers. (No aggregate is used in the apparatus shown in Figure 4 since the refractory baffle extending downwardly serves as a separating means between the conduit outlet and the pebbles.) Gaseous combustible materials and an oxygen-containing gas, such as air, which may be in excess of that needed to supply oxygen for the combustion of the combustible materials, is admixed in mixers as shown or other suitable means, disposed about the lower outer periphery of the heating chamber, and/or a pre-mixed mixture of gaseous combustible material and an oxygen-containing gas may be supplied as desired.

The combustible gas mixture, containing excess oxygen if desired, passes inwardly through the conduits communicating between the mixers and/or pre-mixed supply lines and the pebble heating zone. Greater amounts of the combustible gas mixture are conveyed to the center of the heating zone than to the periphery of such zone by the lower and longer conduits as in the apparatus shown in Figure 1 which preferably have larger vertical cross-sectional area than do the upper, shorter conduits or the amount of combustible gaseous mixture to any level of conduits may be controlled by control valves on the gas lines. In the apparatus shown in Figures 4 and 6 the greater portion of the combustible gas mixture is passed to the conduits in the lower portion of the funnel shaped lower portion of the heating chamber. This is the preferred manner of operation since it is desirable to have the greater portion of the combustible gas mixture burn on the surface of the pebbles which are moving downwardly near the vertical axis of the heating chamber and are ready to flow into the reactor chamber. The resulting products of combustion flow upwardly countercurrent to the pebbles moving downwardly. I find that it is preferable to operate the pebble heating chambers of my invention with the greater portion of pebbles passing from the heating chamber nearer the vertical axis than the periphery of the heating chamber. As the gas mixture passes from the conduits it directly contacts heated pebbles which heat the gas mixture to its kindling temperature and the gas burns on the surface of the pebbles. The gaseous mixture in the conduits is at a lower temperature than its kindling temperature and is moving at a velocity greater than that of flame propagation. The gaseous products of the surface combustion pass upwardly countercurrent to the pebbles and interchange heat with the pebbles. As the products of combustion pass from the top of the pebble bed they escape from the chamber through effluent outlet 27. The heated pebbles pass downwardly through pebble outlet 20 into the fluid heating chamber within shell 28 as pebbles are withdrawn from the bottom of shell 28. Under normal operations the pebble outlet and at least a portion of the fluid heating chamber and the pebble heating chamber are filled with the moving bed of pebbles. In some cases a pebble surge chamber may be arranged ahead of the pebble heating chamber in the pebble flow. When such an arrangement exists, sufficient pebbles may be supplied to entirely fill the space within the heating chamber. Also, sometimes the fluid heating chamber is operated so as to be completely filled with pebbles. Material to be treated is injected into the lower portion of the fluid heating chamber through inlet conduit 32. The fluid material rises through the fluid heating chamber gaining heat from the downwardly flowing pebbles and passes rapidly out of the fluid heating chamber through effluent outlet conduits 29. Pebbles, which have been cooled during the fluid heating step, pass out of the bottom of the fluid heating chamber and are carried by elevator 34 to the upper portion of the heating chamber within shell 11. Herein they are once again subjected to the pebble heating step described above.

The separation means used to separate the pebbles from the conduits communicating between the mixers and/or pre-mix supply lines and the pebble heating chamber may be a conical refractory baffle (not shown), which baffle may be perforate to allow the flow of gas therethrough. Should such a baffle be utilized, it would be advisable to provide it with concentric retainer extensions protruding downward from its underneath side. These extensions would substantially prevent gases injected through certain of the conduits from passing upwardly along the underneath side of the conical baffle to the periphery of the pebble bed. In that manner, gas flow through certain of the conduits would pass into a particular portion of the pebble bed. When a layer of aggregate material is used as such separation means, it would also be advisable to utilize such a retainer member to prevent combustible gas mixture from flowing upwardly and outwardly through the aggregate material without contacting pebbles at a desired point in the pebble bed.

In some instances products of combustion may be carried from the pebble heating chamber into the fluid heating chamber with the pebbles, and heated products may rise from the fluid heating chamber, through the pebble outlet conduit, into the pebble heating chamber. Such an occurrence would cause the conditions in either chamber to be unstable. For that reason, it may be desirable to provide conduit means for injecting into the pebble conduit between the chambers as a sealing means, a hot gas which is inert to the reaction. The sealing means would prevent other gases from passing therethrough.

The method and apparatus of my invention is particularly useful in pebble heater apparatus where carbon is deposited on the pebbles during the reaction step or where a catalytic pebble is being used such as in a catalytic hydrocarbon conversion process and carbon is deposited on the catalyst reducing its efficiency. Under these conditions, I prefer to regenerate and heat the pebbles by admitting a flue-gas of predetermined oxygen content, but without any combustible constituents, into the uppermost combustible material inlets in the pebble heating chamber so as to burn the carbon from the catalyst or from the surface of the pebble in the upper portion of the heating chamber in a relatively well-defined carbon burning zone in which the maximum temperature can be controlled by the oxygen content of the flue-gas as well as the volume of the flue-gas admitted. For example, the oxygen content might be limited to a predetermined range of 2 to 5 percent. In operating in this manner the additional heat necessary to raise the regenerated pebbles, catalytic or otherwise, to reaction temperature is supplied by the injection of a combustible gaseous mixture into the lower inlets in the lower portion of the pebble heating chamber. By this procedure it is possible to prevent overheating of a catalyst during the burning off of the carbon, and it is also possible to accurately control the temperature level to which the pebbles are finally raised prior to their entry into the reaction chamber.

When using a pebble heater chamber having an inside diameter of about 4.5 feet it is preferred to discharge about 90 per cent by volume of the combustible gas mixture into the central portion of the bed within a circle 1.75 feet in diameter. The temperature of the combustion products where surface combustion takes place may be controlled to any specific temperature, depending upon the elected process, as hereinbefore described. That temperature may vary between about 2000° F. and about 3600° F. When the temperature is maintained at about 2400° F. the pebbles are raised to a temperature of about 2000° F. and the effluent which is removed from the top of the pebble heater chamber is at a temperature of about 900° F. The pebbles may be heated, in any selected process, to temperatures varying between about 1500° F. and about 3200° F.

The above apparatus size is intended to be merely exemplary and should not be construed as to unduly limit the scope of my invention.

As will be evident to those skilled in the art, various modifications of this invention can be made or followed in the light of the foregoing disclosure, discussion and example, without departing from the spirit or scope of the disclosure or from the scope of the claims.

I claim:

1. In a pebble heater apparatus utilizing a gravitating bed of heated pebbles, an improved pebble heating chamber comprising a vertically disposed closed cylindrical outer metal shell, enclosing a heating chamber therein; a lining of refractory insulation inside said outer shell; a pebble inlet and a flue-gas outlet in the upper portion of said heating chamber; a pebble outlet in the lower portion of said heating chamber extending therein; conduits communicating between points outside said heating chamber and points within the lower portion of said heating chamber, said conduits being disposed radially in rows in layers around the periphery of the lower portion of said heating chamber, said conduits in each additional layer being shorter than those in the next preceding lower layer, said conduits in said layers having a greater cross-sectional area than conduits in a layer immediately above, and each of said rows having a plurality of said conduits, each of said conduits in each of said rows having individual gas mixers at their outer ends to mix fuel-gas and oxygen-containing gas and supply a resulting mixture to each individual conduit; a bed of aggregate material covering the inner ends of said conduits, said bed of aggregate material being supported by said conduits and by the upper portion of said pebble outlet in the lower portion of said heating chamber, and forming a funnel-shaped passageway for said gravitating pebbles; and means to supply fuel-gas and oxygen-containing gas to said mixers.

2. In a pebble heater apparatus utilizing a gravitating bed of heated, spherical, ⅛ inch to 1 inch diameter pebbles, an improved pebble heating chamber comprising a vertically disposed closed cylindrical outer shell, enclosing a heating chamber therein; a lining of refractory insulation inside said outer shell; a pebble inlet and a flue-gas outlet in the upper portion of said heating chamber; a cylindrical pebble outlet conduit in the lower portion of said heating chamber extending therein; a plurality of fuel-gas and air mixers disposed about the lower periphery of said chamber; fuel-gas and air mixture conduits communicating between each of said fuel-gas and air mixers and points within the lower portion of said heating chamber, said conduits being disposed horizontally and radially in rows in layers around the periphery of the lower portion of said heating chamber, said conduits in each additional layer being shorter than those in the next preceding lower layer, said conduits in a layer having a greater cross-sectional area than conduits in a layer immediately above, and each of said rows having a plurality of said fuel-gas and air mixture conduits; a bed of aggregate material covering the inner ends of said fuel-gas and air mixture conduits, said bed of aggregate material being supported by said fuel-gas and air mixture conduits and by the upper portion of said pebble outlet conduit in the lower portion of said heating chamber, and forming a funnel-shaped passageway for said gravitating pebbles; and means to supply fuel-gas and air to said mixers.

LOUIS J. WEBER.

REFERENCES CITED

The following references are of record in the file of this patent:

UNITED STATES PATENTS

| Number | Name | Date |
|---|---|---|
| 2,345,067 | Osann | Mar. 28, 1944 |
| 2,405,395 | Bahlke et al. | Aug. 6, 1946 |
| 2,412,136 | Evans et al. | Dec. 3, 1946 |
| 2,432,503 | Bergstrom et al. | Dec. 16, 1947 |
| 2,446,805 | Bergstrom | Aug. 10, 1948 |
| 2,499,624 | Bergstrom et al. | Mar. 7, 1950 |
| 2,499,704 | Utterback et al. | Mar. 7, 1950 |
| 2,509,854 | Bailey et al. | May 30, 1950 |

FOREIGN PATENTS

| Number | Country | Date |
|---|---|---|
| 36,693 | Sweden | May 13, 1914 |